UNITED STATES PATENT OFFICE.

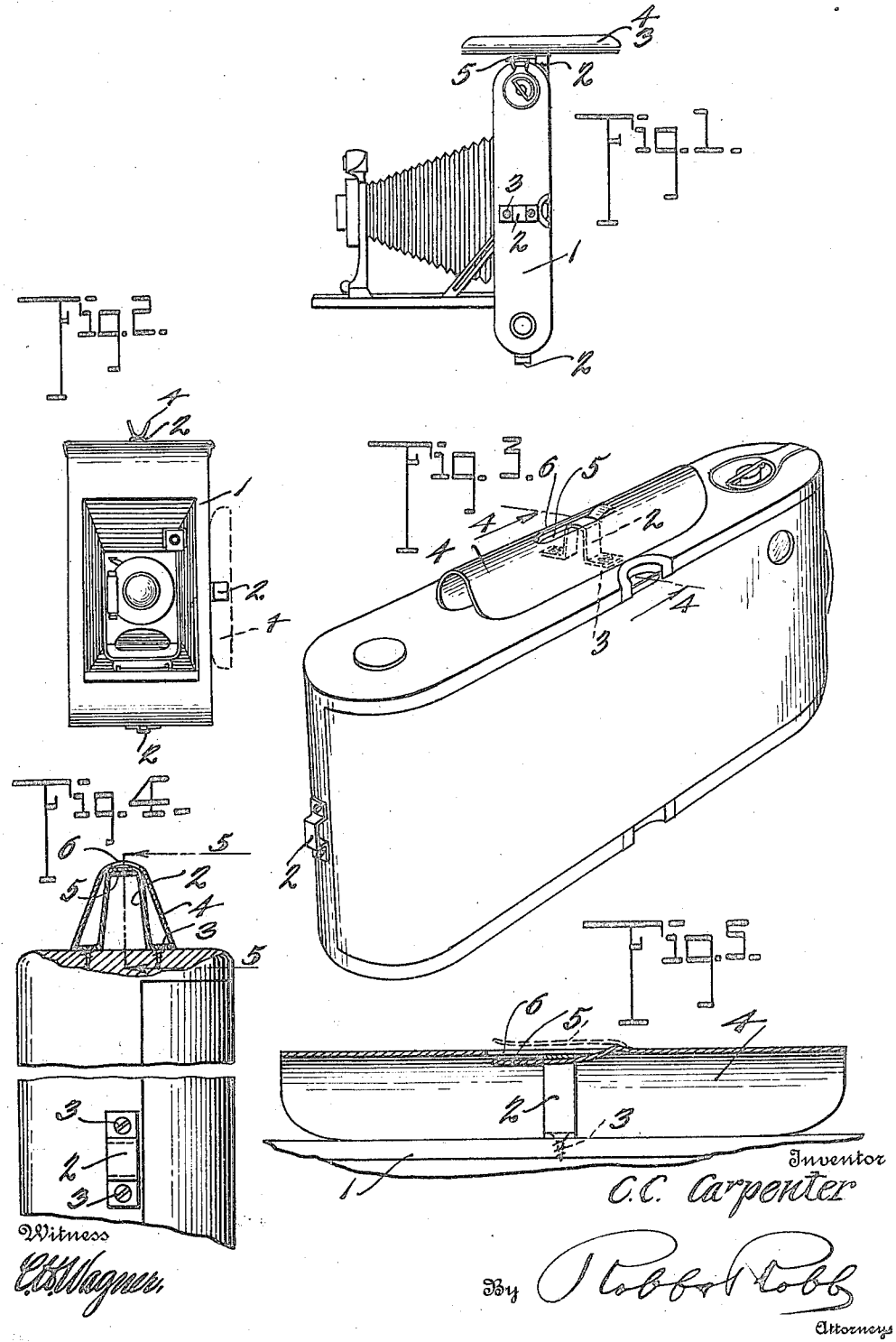

CLIFFORD C. CARPENTER, OF AKRON, OHIO.

FINDER FOR CAMERAS.

1,253,144.  Specification of Letters Patent.  Patented Jan. 8, 1918.

Application filed February 13, 1917. Serial No. 148,433.

*To all whom it may concern:*

Be it known that I, CLIFFORD C. CARPENTER, a citizen of the United States, residing at Akron, in the county of Summit and State of Ohio, have invented certain new and useful Improvements in Finders for Cameras, of which the following is a specification.

The present invention has to do with sight devices for cameras, known as finders, the main object being to provide a simple article capable of being attached to the camera body in different positions and so constructed as to facilitate the accurate positioning of the camera in the taking of pictures, especially of moving objects.

A special feature of my invention lies in the construction of the attaching means which is formed so as to hold the finder in normal operative or inverted inoperative positions.

With the above and other objects in view, this invention consists in the construction, combination and arrangement of parts all to be hereinafter more fully described, claimed and illustrated in the accompanying drawings, wherein:—

Figure 1 is a side elevation showing the finder in operative position on the top of said camera.

Fig. 2 is a front elevation thereof and showing in dotted lines the device in inoperative position.

Fig. 3 is a perspective view with the finder disposed in inverted inoperative position.

Fig. 4 is a transverse sectional view taken on the line 4—4 of Fig. 3.

Fig. 5 is a longitudinal sectional view of the finder on the plane indicated by the line 5—5 of Fig. 4.

Throughout the following detail description and on the several figures of the drawing, similar parts are referred to by like reference characters.

Referring to the drawing, the numeral 1 represents an ordinary type of camera or "kodak" with which my device may be used. Projecting outwardy therefrom is a fastening loop or clip 2 provided with ears 3, secured by any suitable means to a side of the camera.

In order to enable the photographs to be taken with the camera held in various positions as customary, I provide an attaching clip 2 on several sides with any one of which the finder may be connected.

The finder 4 which constitutes the subject-matter of the invention is of elongated trough like configuration, or in other words, the body of the finder 4 is open at one side. From the back or bottom of the body and centrally thereof is stamped out a resilient tongue 5. The said tongue 5 when in normal position stands out slightly from the curved back portion of the finder for facilitating attachment thereof to the camera, the tongue being slipped through a clip 2 into frictional engagement.

In this normal position the finder seats on the clip 2 with the open side outward. It will be obvious that in this position, the operator can readily sight along the finder, the open side of which permits of a general unrestricted view of the surroundings. The confines of the finder however, enable the accurate positioning with respect to the particular object which is to be photographed.

An article of this character is especially useful when the photograph is to be taken of a moving object.

When it is desired to secure the finder in inoperative position as when not in use, it is inverted or placed with its edges against the side of the camera body over the attaching clip on its surface. The tongue 5 is then depressed through the opening 6 formed in the body by stamping out the tongue, and slipped beneath the attaching clip, as shown in Fig. 5. The finder is thus interlocked therewith. Thus it is that the tongue affords the fastening means for holding the finder in either operative or inoperative position.

Having thus described my invention, what I claim as new is:

1. In combination, a camera having an attaching element, a finder, and means carried by said finder for interlocking said finder with the attaching element, said finder comprising an elongated open sided body.

2. In combination, a camera having an attaching clip thereon, a finder comprising a trough like body, and a yieldable tongue on said body engageable with the clip aforesaid.

3. In combination, a camera having an attaching clip thereon, a finder comprising a trough like body, and a tongue stamped from the body and engageable with the clip to hold the finder in operative position, said finder being invertible into inoperative position and said tongue being also engageable with the clip in the latter position.

4. As a new article of manufacture, a finder for cameras embodying attaching means comprising an elongated trough like body having stamped centrally therefrom a yieldable tongue, thereby providing an opening through the body, said tongue being movable through said opening for attaching the finder to the camera.

In testimony whereof I affix my signature.

CLIFFORD C. CARPENTER.

Copies of this patent may be obtained for five cents each, by addressing the "Commissioner of Patents, Washington, D. C."